(12) United States Patent
Verheyden et al.

(10) Patent No.: US 10,302,872 B2
(45) Date of Patent: May 28, 2019

(54) FIBER OPTIC ADAPTER

(71) Applicants: COMMSCOPE CONNECTIVITY BELGIUM BVBA, Kessel-lo (BE); COMMSCOPE TECHNOLOGIES LLC, Hikory, NC (US)

(72) Inventors: Danny Willy August Verheyden, Gelrode (BE); Erwin Junius, Tremelo (BE); Detlev Thalemann, Berlin (DE); Bernardus Johannes Nicolas Geling, Genk (BE); Robert Charles Flaig, Lancaster, PA (US)

(73) Assignees: Commscope Connectivity Belgium BVBA (BE); CommScope Technologies LLC, Hickory, NC (US)

( * ) Notice: Subject to any disclaimer, the term of this patent is extended or adjusted under 35 U.S.C. 154(b) by 0 days.

(21) Appl. No.: 14/896,393

(22) PCT Filed: Jun. 5, 2014

(86) PCT No.: PCT/US2014/041102
§ 371 (c)(1),
(2) Date: Dec. 6, 2015

(87) PCT Pub. No.: WO2014/197701
PCT Pub. Date: Dec. 11, 2014

(65) Prior Publication Data
US 2016/0124160 A1 May 5, 2016

Related U.S. Application Data

(60) Provisional application No. 61/831,392, filed on Jun. 5, 2013.

(51) Int. Cl.
*G02B 6/38* (2006.01)

(52) U.S. Cl.
CPC ........ *G02B 6/3825* (2013.01); *G02B 6/3809* (2013.01); *G02B 6/3831* (2013.01);
(Continued)

(58) Field of Classification Search
None
See application file for complete search history.

(56) References Cited

U.S. PATENT DOCUMENTS 3,725,845 A * 4/1973 Moulin ................. H01R 13/28
439/291
7,585,118 B1 * 9/2009 Lumpkin ............. G02B 6/3825
385/53
(Continued)

FOREIGN PATENT DOCUMENTS

JP 2009-199097 9/2009

OTHER PUBLICATIONS

International Search Report for International Application No. PCT/US2014/041102 dated Oct. 15, 2014 (3 pages).
(Continued)

*Primary Examiner* — Chris H Chu
(74) *Attorney, Agent, or Firm* — Merchant & Gould P.C.

(57) ABSTRACT

A fiber optic adapter includes a first side wall (110), a second side wall (112) opposite the first side wall, a top wall (114), and a bottom wall (116) opposite the top wall. A cavity (10) is defined by the top wall, the bottom wall, the first side wall, and the second side wall, and an optical fiber alignment device (20) is situated in the cavity. The top wall (114) has an opening (117) therein, and a cover (118) is configured to selectively close the opening.

8 Claims, 8 Drawing Sheets

(52) U.S. Cl.
CPC ......... *G02B 6/3849* (2013.01); *G02B 6/3869* (2013.01); *G02B 6/3879* (2013.01); *G02B 6/3881* (2013.01)

(56) References Cited

U.S. PATENT DOCUMENTS

| | | | |
|---|---|---|---|
| 2002/0181888 A1* | 12/2002 | Zimmel | G02B 6/266 |
| | | | 385/72 |
| 2005/0232553 A1* | 10/2005 | Holmquist | G02B 6/3869 |
| | | | 385/78 |
| 2009/0028507 A1 | 1/2009 | Jones et al. | |
| 2010/0054668 A1 | 3/2010 | Nelson | |
| 2011/0268393 A1* | 11/2011 | Uboldi | G02B 6/3855 |
| | | | 385/77 |
| 2012/0251058 A1* | 10/2012 | Kolesar | G02B 6/3831 |
| | | | 385/92 |

OTHER PUBLICATIONS

International Search Report and Written Opinion for International Application No. PCT/US2014/041102 dated Oct. 15, 2014 (19 pages).

* cited by examiner

FIBER OPTIC ADAPTER

CROSS-REFERENCE TO RELATED APPLICATION(S)

This application is a National Stage of PCT International Patent application No. PCT/US2014/041102, filed 5 Jun. 2014 and claims benefit of U.S. Patent Application Ser. No. 61/831,392 filed on Jun. 5, 2013 and which applications are incorporated herein by reference. To the extent appropriate, a claim of priority is made to each of the above disclosed applications.

BACKGROUND

The present disclosure relates generally to a fiber optic connection system. Modern optical devices and optical communications systems widely use fiber optic cables. Fiber optic cables are often used to transmit light signals for high speed data transmission. A fiber optic cable typically includes an optical fiber or optical fibers, a buffer or buffers that surrounds the fiber or fibers, a strength layer that surrounds the buffer or buffers, and an outer jacket. The optical fibers function to carry optical signals. A typical optical fiber includes an inner core surrounded by a cladding that is covered by a coating. Buffers (e.g., loose or tight buffer tubes) typically function to surround and protect coated optical fibers. Strength layers add mechanical strength to fiber optic cables to protect the internal optical fibers against stresses applied to the cables during installation and thereafter. Example strength layers include aramid yarn, steel and epoxy reinforced glass roving. Outer jackets provide protection against damage caused by crushing, abrasions, and other physical damage. Outer jackets also provide protection against chemical damage (e.g., ozone, alkali, acids).

Fiber optic cable connection systems are used to facilitate connecting and disconnecting fiber optic cables in the field without requiring a splice. A typical fiber optic cable connection system for interconnecting two fiber optic cables includes fiber optic connectors mounted at the ends of the fiber optic cables, and an adapter for mechanically and optically coupling the fiber optic connectors together. Fiber optic connectors generally include ferrules that support the ends of the optical fibers of the fiber optic cables. The end faces of the ferrules are typically polished and are often angled. The adapter includes coaxially aligned ports (i.e., receptacles for receiving the fiber optic connectors desired to be interconnected). The adapter includes an internal sleeve that receives and aligns the ferrules of the fiber optic connectors when the connectors are inserted within the ports of the adapter. With the ferrules and their associated fibers aligned within the sleeve of the adapter, a fiber optic signal can pass from one fiber to the next. Some systems are known which include alignment of fibers but no ferrules.

Improvements in the adapters are desired.

SUMMARY

In accordance with aspects of the present disclosure, a fiber optic adapter includes a first side wall, a second side wall opposite the first side wall, a top wall, and a bottom wall opposite the top wall. A cavity is defined by the top wall, the bottom wall, the first side wall, and the second side wall. An optical fiber alignment device is situated in the cavity. The top wall has an opening therein, and a cover is configured to selectively close the opening. In some embodiments, the first and second mounting halves receive the optical fiber alignment device.

In accordance with certain aspects of the present disclosure, a fiber optic adapter includes a first side wall and a second side wall opposite the first side wall. A first alignment structure is on the first side wall, and a second alignment structure is on the second side wall. The second alignment structure corresponds to the first alignment structure and is configured to cooperate with the first alignment structure on an adjacent fiber optic adapter. In some examples, the first alignment structure includes a plurality of bosses extending from the first side wall, and the second alignment structure includes a plurality of recesses in the second side wall corresponding to the bosses.

In accordance with further aspects of the present disclosure, some embodiments include a plurality of the fiber optic adapters situated side-by-side such that the first alignment structure of one of the fiber optic adapters cooperates with the second alignment structure of an adjacent fiber optic adapter. In some implementations, at least some of the ends of the fiber optic adapters are aligned with one another, and in other configurations at least some of the ends of the fiber optic adapters are off-set from one another.

In some examples, the fiber optic adapter further includes a top wall and a bottom wall opposite the top wall. A cavity is defined thereby, and an optical fiber alignment device is situated in the cavity. An opening may be provided in the top wall to facilitate inserting the optical fiber alignment device into the cavity. A cover closes the opening after inserting the optical fiber alignment device is inserted.

In accordance with still further aspects of the present disclosure, a fiber optic adapter system includes first and second fiber optic adapters situated in a side-by-side arrangement. Each of the fiber optic adapters has a first side wall, a second side wall opposite the first side wall, a first alignment structure on the first side wall, and a second alignment structure on the second side wall. The first alignment structure of the first fiber optic adapter cooperates with the second alignment structure of the second fiber optic adapter. In this manner, a duplex adapter can be formed from two simplex adapters. Other configurations are possible, including multiples of two adapters. Several single adapters can be connected as desired to form various configurations, such as staggered, non-staggered, stair stepped, etc.

DETAILED DESCRIPTION

Figure 1:
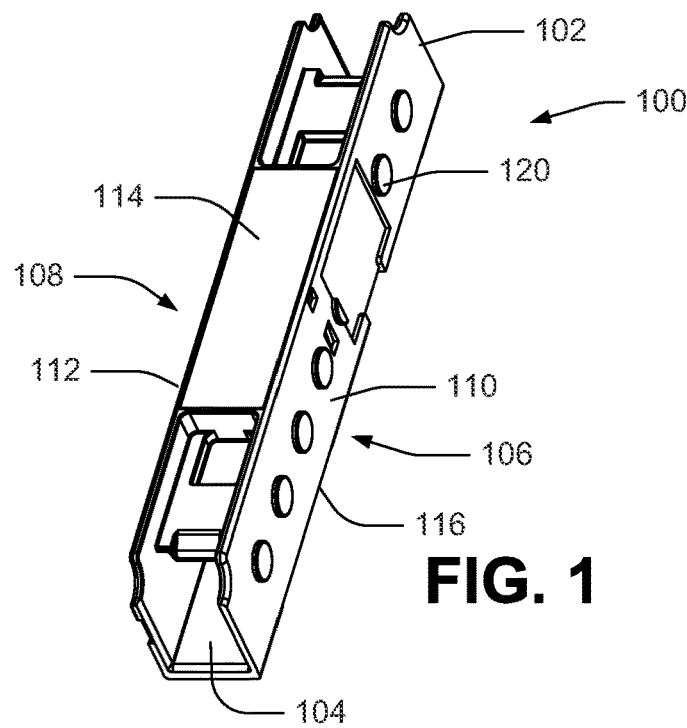
FIG. 1 is perspective view illustrating an example of a fiber optic adapter in accordance with aspects of the present disclosure.
Figure 2:
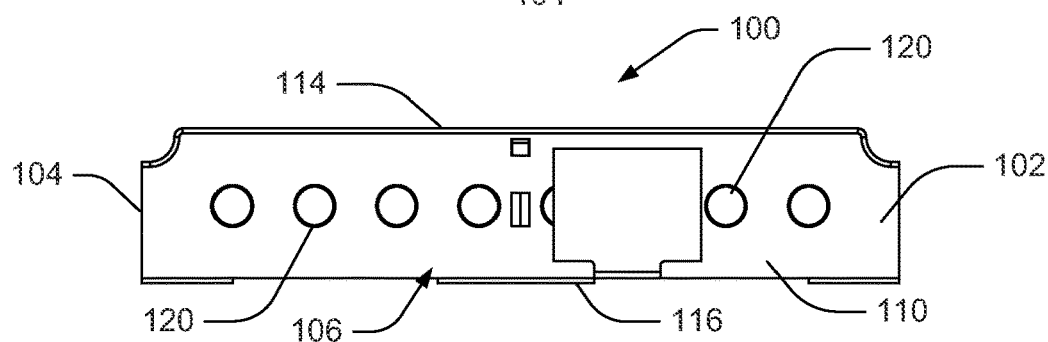
FIG. 2 is a side view of the fiber optic adapter illustrated in FIG. 1.
Figure 3:
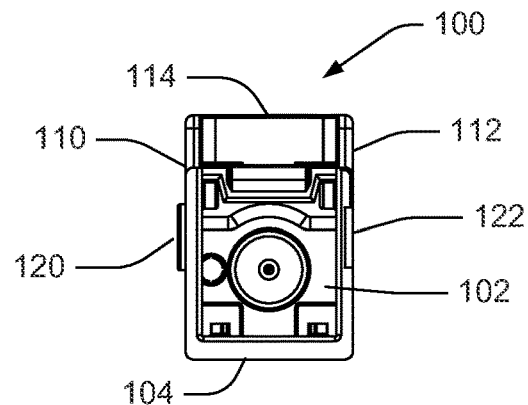
FIG. 3 is an end view of the fiber optic adapter illustrated in FIG. 1.
Figure 4:
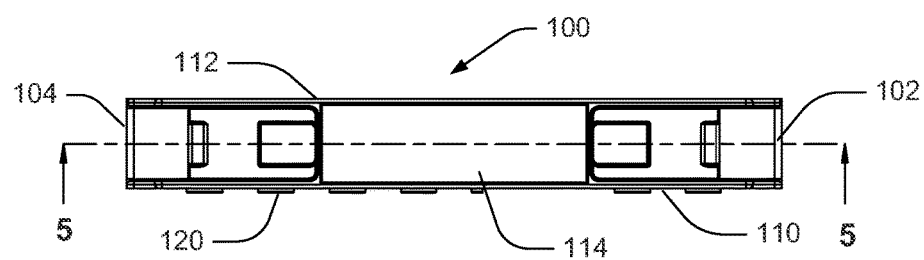
FIG. 4 is a top view of the fiber optic adapter illustrated in FIG. 1.

In the following Detailed Description, reference is made to the accompanying drawings, which form a part hereof, and in which is shown by way of illustration specific embodiments in which the invention may be practiced. In this regard, directional terminology, such as top, bottom, front, back, etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

In general, this disclosure relates to a fiber optic connection systems. Fiber optic cable connection systems can be used to facilitate connecting and disconnecting fiber optic cables in the field without requiring a splice. An adapter receives ends of fiber optic cables at opposite ends thereof for mechanically and optically coupling the fiber optic connectors together. A simplex adapter receives the ends of two respective cables to make a single connection. A duplex adapter makes two connections, receiving the ends of two sets of cables.

FIGS. 1-5 illustrate an example of a fiber optic adapter 100 in accordance with certain teachings of the present disclosure. The fiber optic adapter 100 includes first and second ends 102, 104 configured to receive ends of two optical fibers, and coaxially align and optically connect them together such that optical transmissions can be conveyed from optical fiber to optical fiber. The ends of the optical fibers to be connected typically have fiber optic connectors mounted thereon. Such fiber optic connectors generally include ferrule-less (bare optical fibers) or ferrules that support the ends of the optical fibers of the fiber optic cables.

The adapter 100 includes first and second side walls 110, 112, and top and bottom walls 114,116. The first side wall 110 has a first alignment structure 106 and the second side wall 112 has a second alignment structure 108 corresponding to the first alignment structure. The second alignment structure 108 is configured to cooperate with the first alignment structure 106 on an adjacent fiber optic adapter so as to align two or more adjacent adapters 100 and fix them in place relative to one another. Among other things, this can prevent on adapter from moving laterally when a user inserts a fiber optic connecter into the adapter, for example.

In the example illustrated in FIGS. 1-5, the first alignment structure 106 includes one or more bosses 120 extending from the first side wall 110, and the second alignment structure 108 includes corresponding recesses 122 in the second side wall 112. In the illustrated example, the bosses 120 are generally cylindrical projections extending from the first side wall and the recesses 120 are correspondingly shaped to receive the bosses 120 of another adapter. The bosses 120 and corresponding recesses 122 are described herein as generally cylindrical because there may be some taper of the side walls and/or other variation in the shape of the bosses 120 and recesses 122 due to manufacturing processes and tolerances. The generally cylindrical bosses 120 and recesses 122 are examples used in some implementations, other shapes are possible.

Figure 5:
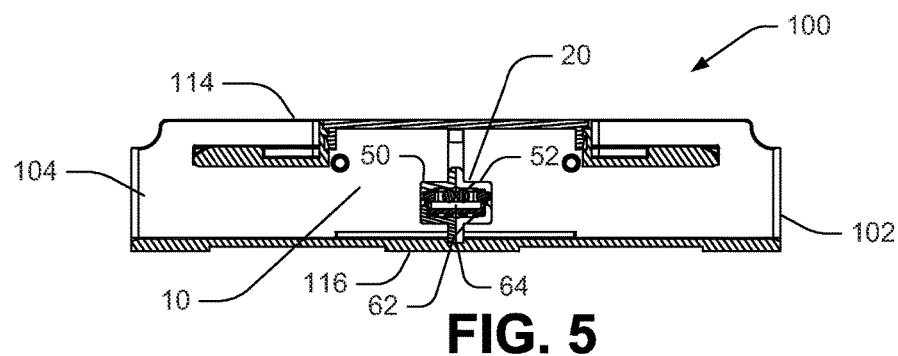
FIG. 5 is a cross section view taken along line 5-5 of FIG. 4.
Figure 6:
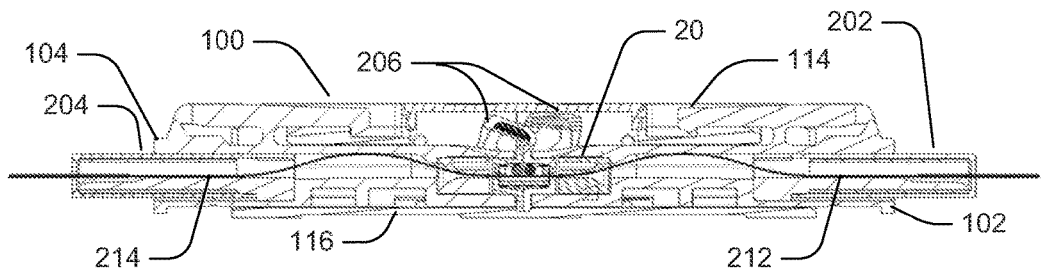
FIG. 6 is a cross section view of the fiber optic adapter illustrated in FIG. 1 including fiber optic connectors received by the fiber optic adapter.
Figure 7:
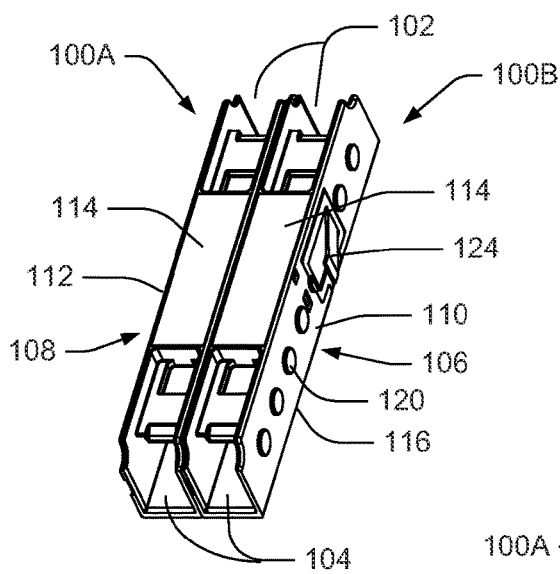
FIG. 7 is a perspective view illustrating two of the fiber optic adapters illustrated in FIG. 1 situated in a side-by-side configuration.
Figure 8:
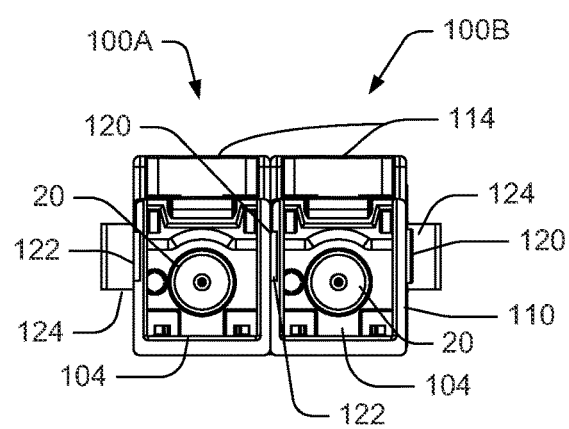
FIG. 8 is an end view of the of the fiber optic adapters illustrated in FIG. 7.
Figure 9:
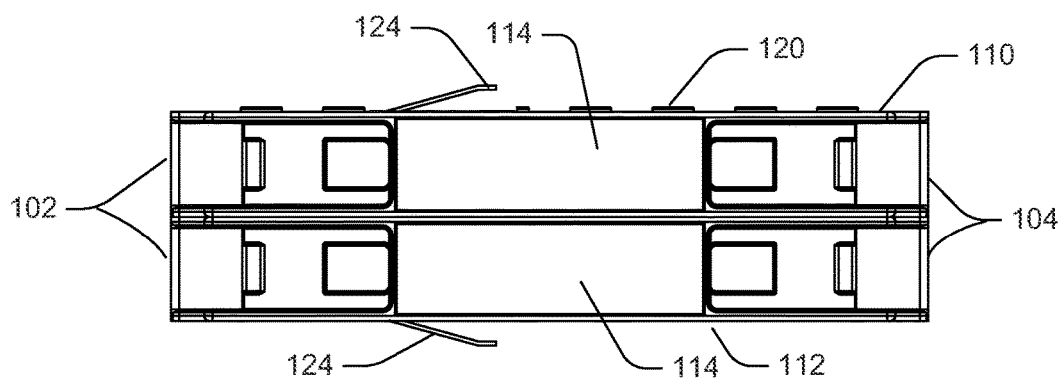
FIG. 9 is a top view of the of the fiber optic adapters illustrated in FIG. 7.
Figure 10:
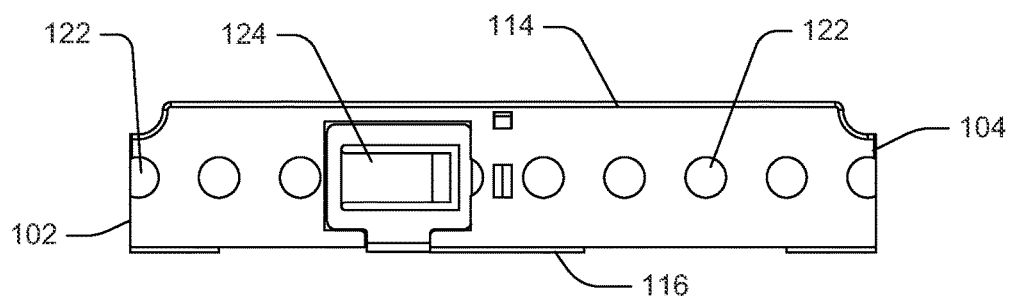
FIG. 10 is a side view of the of the fiber optic adapters illustrated in FIG. 7.

As shown in the cross section view of FIG. 5, the first and second side walls 110,112 and the top and bottom walls 114,116 define a cavity 10 in which an optical fiber alignment device 20 is situated. FIG. 6 is another cross section view, illustrating connectors 202,204 of respective first and second fiber optic cables received in the first and second ends 102, 104 of the adapter 100. When first and second optical fibers 212,214 of the first and second fiber optic cables are inserted into opposite ends of the optical fiber alignment device 20, the optical fibers are guided to an orientation in which the optical fibers are coaxially aligned with one another with end faces of the optical fibers abutting or in close proximity to one another. A mechanism can be provided within the optical fiber alignment device 20 for mechanically retaining the optical fibers in an optically connected orientation. Thus, the optical fiber alignment device 20 functions to provide a mechanical interface between the optical fibers inserted therein.

FIGS. 7-10 illustrate an example where two of the adapters 100A,100B are stacked together to form a duplex adapter. The two simplex adapters 100A,100B situated side-by-side as illustrated in FIGS. 7-10 occupy the same footprint as an equivalent duplex adapter. The first alignment structure 106 of the first adapter 100A cooperates with the second alignment structure 108 of the adjacent second adapter 100B such that, in the illustrated example, the bosses 120 of the first one of the adapters 100A are received by the recesses 122 of the second one of the adapters 100B to lock the adapters 100A, 100B in place, preventing lateral or rotational relative movement of the adapters 100A, 100B. A pair of retaining clips 124 can be provided for locking the adapters 100A, 100B in place when in use as a duplex adapter.

As stated above, FIGS. 7-10 illustrate an example where two simplex adapters 100A,100B are situated to form a duplex adapter. However, it should be noted that other implementations of the disclosed adapter 100 are envisioned, including a duplex adapter formed by the first and second side walls 110,112 and the top and bottom walls 114,116, and further including one set of the alignment structures 106,108 for each duplex adapter.

Figure 11:
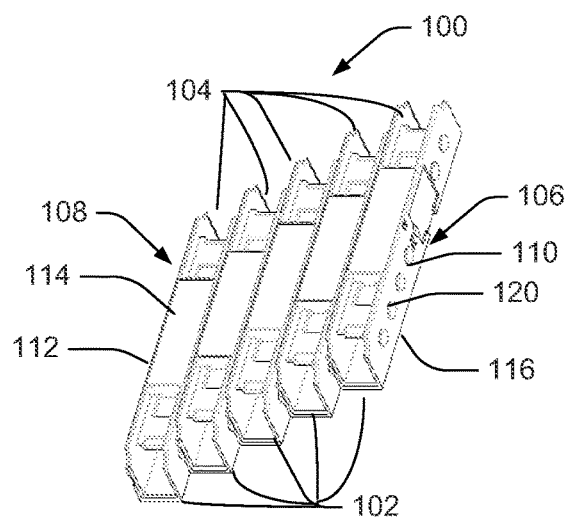
FIG. 11 is a perspective view illustrating five of the fiber optic adapters illustrated in FIG. 1 situated in an off-set, side-by-side configuration.

In the example illustrated in FIGS. 7-10, the first and second ends 102,104 of the adapters 100A, 100B are aligned. Accordingly, each of the recesses 122 of the second adapter 100B receives a corresponding one of the bosses 120 of the first adapter 100A. In other implementations, the adapters are off-set from one another, such that the first and second ends 102,104 are not aligned. This could be desirable, for example, to facilitate inserting or removing the connector 102 of one fiber optic cable from one adapter without interfering with the connector received by an adjacent adapter. FIG. 11 illustrates an example of such an embodiment, where a plurality of fiber optic adapters 100 are each off-set from an adjacent adapter, forming a stepped configuration. In such a configuration, some of the bosses 120 may not be received by a recess 122 of the adjacent adapter 100, and some recesses 122 may not receive a boss 120.

Figure 12:
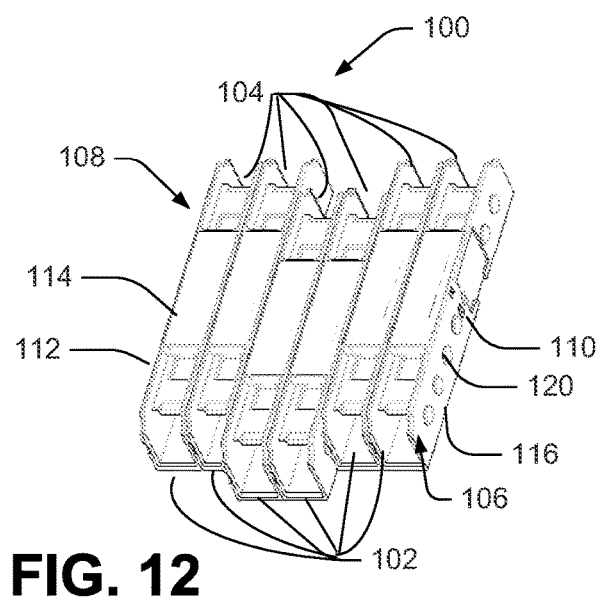
FIG. 12 is a perspective view illustrating six of the fiber optic adapters illustrated in FIG. 1 situated in another side-by-side configuration in which some adapters are aligned with adjacent adapters and others are off-set from adjacent adapters.

FIG. 12 illustrates a further embodiment in which pairs of fiber optic adapters 100 are off-set from adjacent pairs of adapters 100. Thus, some of the adapters 100 are aligned with one adjacent adapter 100 on one side, while the ends 102,104 of the adapter 100 are not aligned with the adapter 100 adjacent to the opposite side of the adapter. The arrangement of FIG. 12 shows a back and forth staggering of pairs of adapters. Of course other arrangements are possible, such as off-setting each of the adapters 100 to form a staggered configuration, aligning the ends of all of the plurality of adapters 100, etc.

Figure 13:
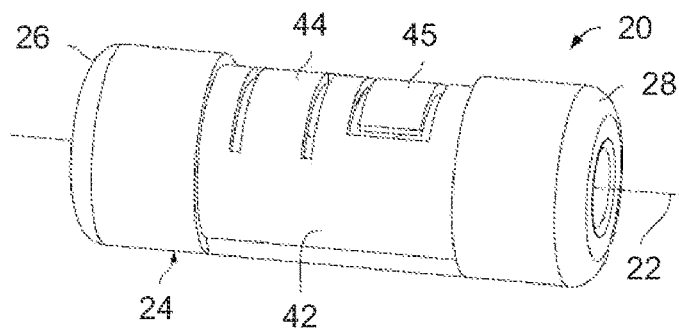
FIG. 13 is a perspective view illustrating an example of an optical fiber alignment device included in some embodiments of the disclosed fiber optic adapter.
Figure 14:
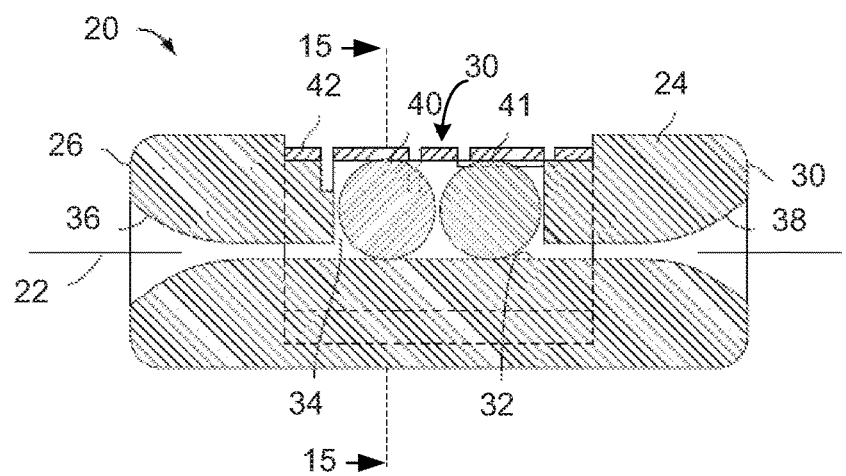
FIG. 14 is a cross sectional side view of the optical fiber alignment device illustrated in FIG. 13.
Figure 15:
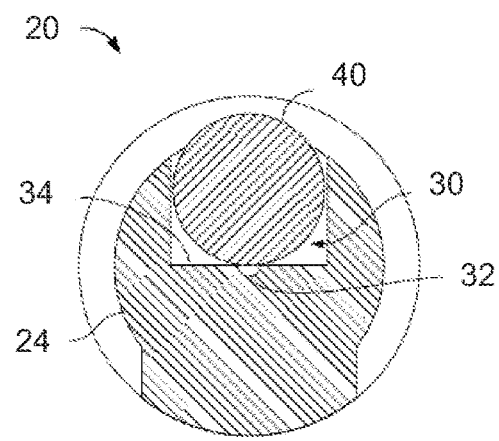
FIG. 15 is a cross sectional end view of the optical fiber alignment device illustrated in FIG. 13.

FIGS. 13-15 illustrate further details of an example optical fiber alignment device 20 employed in some embodiments. The optical fiber alignment device includes an alignment housing 24 (e.g., a molded plastic housing) including first and second ends 26, 28. The alignment housing 24 defines a fiber insertion axis 22 that extends through the alignment housing 24 between the first and second ends 26, 28. As shown at FIG. 14, the alignment housing 24 includes a fiber alignment region 30 at an intermediate location between the first and second ends 26, 28. The fiber alignment region includes an alignment groove 32 that extends along the fiber insertion axis 22. The alignment housing 24 also defines a pocket 34 at the fiber alignment region 30 adjacent to the alignment groove 32. The first end of the alignment housing 26 includes a first funnel 36 that extends along the fiber insertion axis 22 for guiding a first optical fiber into the fiber alignment region 30. The second end 28 of the alignment housing 24 includes a second funnel 38 that extends along the fiber insertion axis 22 for guiding a second optical fiber into the fiber alignment region 30. The first and second funnels 36, 38 are configured to taper inwardly toward the fiber insertion axis 22 as the first and second funnels 36, 38 extend into the alignment housing 24 toward the fiber alignment region 30. The tapered configuration of the funnels 36, 38 functions to guide the first and second optical fibers into coaxial alignment with the fiber insertion axis 22 such that the optical fibers can be easily slid into registration with the alignment groove 32.

When the first and second optical fibers are inserted into the alignment housing 24 along the fiber insertion axis 22, alignment between the optical fibers is provided by the alignment groove 32. In certain embodiments, the alignment groove 32 can have a curved transverse cross-sectional shape (e.g., a semi-circular transverse cross-sectional shape) and can be configured to receive the optical fibers therein such that the optical fibers seat within the alignment groove 32. In such an embodiment, it will be appreciated that the transverse cross-sectional shape of the alignment groove 32 complements the outer diameters of the optical fibers. In alternative embodiments, the alignment groove can have a transverse cross-sectional shape that is generally v-shaped (i.e., the alignment groove 32 can be a v-groove). In such an embodiment, the v-groove provides two lines of contact with each of the optical fibers inserted therein. In this way, the line/point contact with the v-groove assists in providing accurate alignment of the optical fibers.

The optical fiber alignment device 20 further includes structure for urging the optical fibers into contact with the fiber alignment groove 30. In the depicted embodiment, the fiber optic alignment device 20 includes first and second balls 40, 41 (i.e., fiber contact members) positioned within the pocket 34. The pocket 34 has an elongate direction that extends along the fiber insertion axis 22 and the pocket 34 functions to align the balls 40, 41 (e.g., spheres) along the fiber insertion axis 22. The optical fiber alignment device 20 further includes a biasing arrangement for urging the balls 40, 41 generally toward the alignment groove 30. For example, the biasing arrangement can urge the balls 40, 41 in a direction transverse with respect to the fiber insertion axis 22. In the depicted embodiment, the biasing arrangement is shown including a clip 42 (e.g., a metal clip having elastic properties) mounted (e.g., snap fitted) over the alignment housing 24 adjacent the fiber alignment region 30. The clip 42 has a transverse cross-sectional profile that is generally C-shaped. When the clip 42 is snapped over the alignment housing 24, the clip 42 functions to capture the balls 40, 41 within the pocket 34. The clip 42 includes biasing structures such as first and second springs 44, 45 for respectively biasing the balls 40, 41 toward the alignment groove 32. As depicted, the springs 44, 45 are leaf springs having a cantilevered configuration with a base end integrally formed with a main body of the clip 42 and free ends that are not connected to the main body of the clip 42. In the depicted embodiment, the first spring 44 extends from its base end to its free end in a generally clockwise direction around the axis 22 and the second spring 45 extends from its base end to its free end in a generally counterclockwise direction around the axis 22. The springs 44, 45 are defined by cutting or slitting the clip 42 so as to define slots in the clip 42 that surround three sides of each of the springs 44, 45.

FIGS. 16A-16D illustrate further aspects of an example of the adapter 100. In some embodiments, the top wall 114 of the adapter 100 has an opening 117 therein, and an adapter cover 118 is configured to close the opening 117. The illustrated adapter 100 includes a single-piece structure that makes up both ends 102, 104 of the adapter 100, rather than each end comprising a separate piece that is joined in the middle. The unitary structure of the adapter 100, which is formed from molded plastic in some embodiments, provides a stronger and more robust device as compared to devices where two separate end pieces are joined in the middle.

Figure 16A:
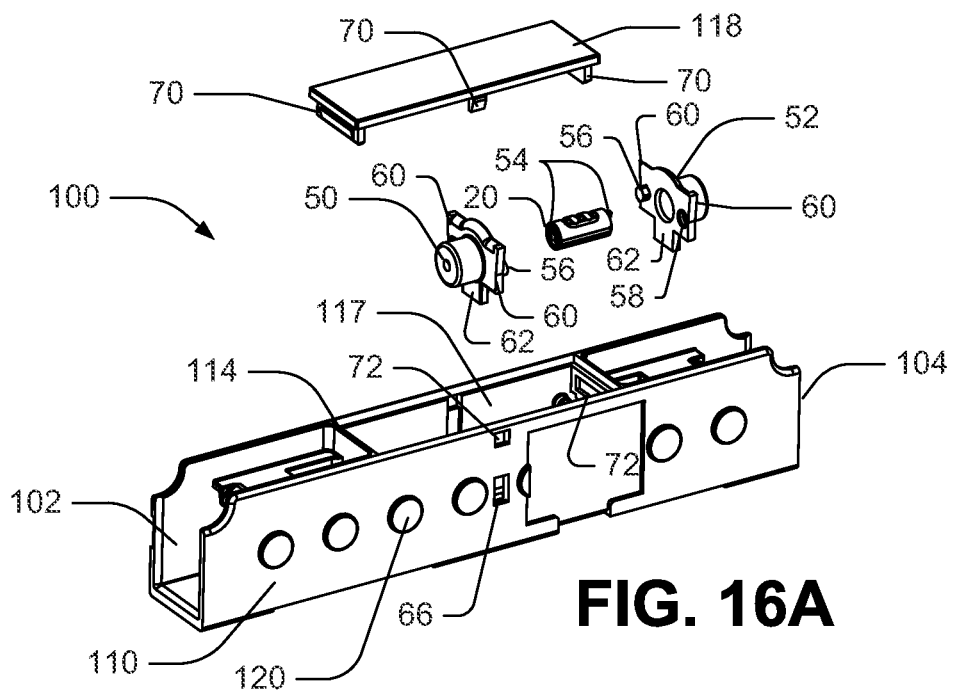
FIGS. 16A-16D illustrate further aspects of the fiber optic adapter shown in FIG. 1, including an assembly method.
Figure 16B:
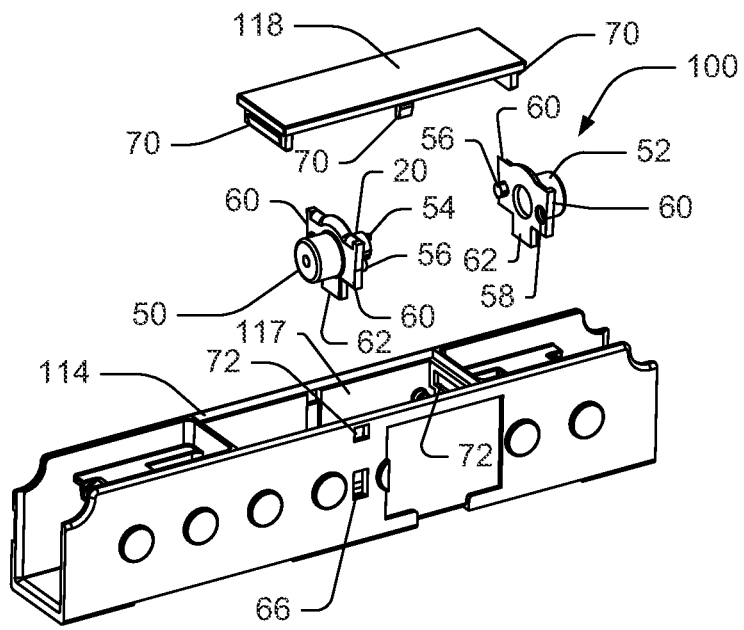
Figure 16C:
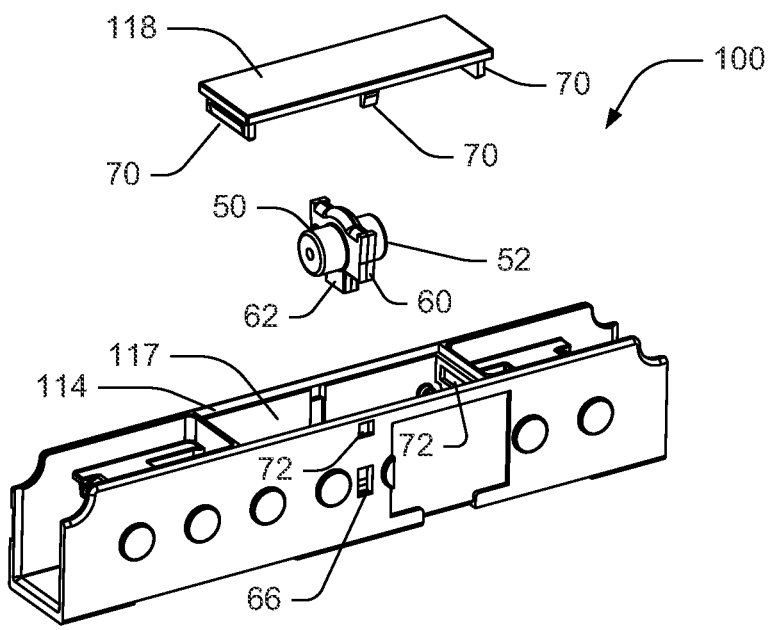

The opening 117 and cover 118 provide access to the cavity 10 inside the adapter to insert the alignment device 20. To assemble the adapter 100, the adapter cover 118 is removed from the top wall 114. The alignment device 20 is inserted in a mounting device having first and second mounting halves 50, 52, as illustrated in FIGS. 16B and 16C. In the example alignment device 20 shown in FIGS. 16A-16D, the alignment device 20 has tabs 54 extending axially from opposite ends of the device 20. FIG. 17 is a perspective view of the adapter 20 illustrated in FIGS. 16A-16C, showing the tabs 54 in further detail. The tabs 54 are received in corresponding recesses 55 in the first and second mounting halves 50,52 and function to prevent the alignment device 20 from turning on its axis when received in the mounting halves 50,52.

Figure 18:
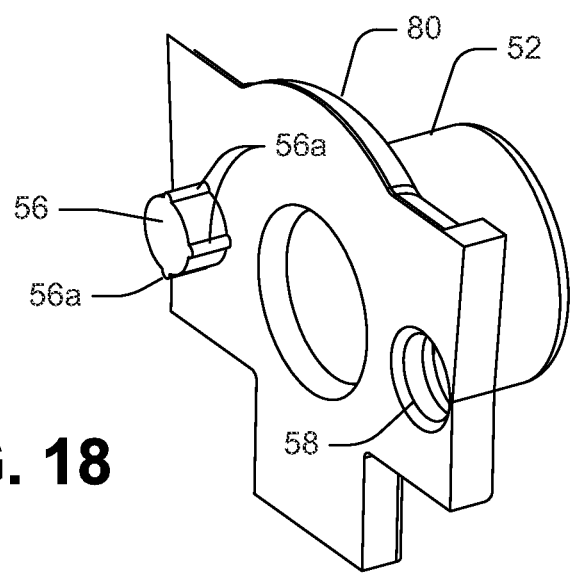
FIG. 18 is a perspective view of one of the mounting halves shown in FIGS. 16A-16D.

The mounting halves 50,52 each have a projection 56 and corresponding recess 58 that mate when the mounting halves 50,52 are press fit together as shown in FIG. 16C. FIG. 18 shows further aspects of the mounting half 52. Mounting half 50 is a mirror image of mounting half 52. The projections 56 in the illustrated example are generally cylindrical, and they include a plurality of keys 56a extending axially from the outer periphery of the projections. The corresponding recesses 58 are generally cylindrical, so that when the projections 56 are press fit together, the keys 56a deform the corresponding recesses 58 to lock the mounting halves 50,52 together with the adapter 20 received therein.

Figure 19:
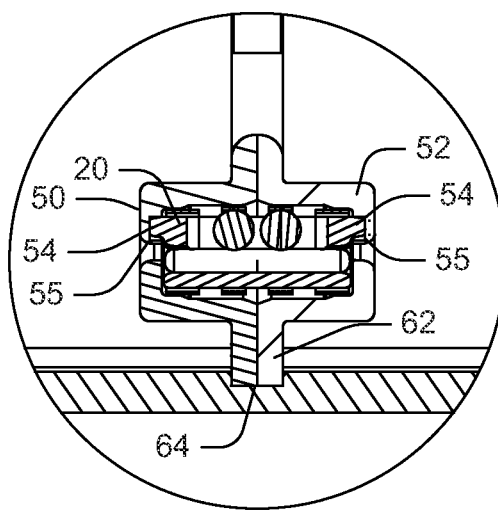
FIG. 19 is a close-up sectional view of assembled adapter and mounting halves shown in FIGS. 16A-16D.

FIG. 19 illustrates further details of the mounting halves 50,52 with the adapter 20 received therein. The tabs 54 have tapered lower surfaces to assist in guiding the tabs 54 into the recesses 55. The mounting halves 50,52 locked together with the adapter 20 received therein creates an assembly that is easier for an assembler to handle as compared to the adapter 20 alone.

The alignment device 20, once enclosed in the mounting halves 50,52, is inserted into the cavity 10 through the opening 117. The mounting halves 50,52 each have ramped tabs 60 on either side thereof and tabs 62 extending from the bottom of the mounting halves 50,52. When the mounting halves are inserted into the cavity 10, the tabs 62 are received in a corresponding recess 64 (shown in FIG. 19) in the bottom wall 116, and the ramped portion of tabs 60 guides a ramped upper portion 60a into openings 66 in the sidewalls 110, 112 to lock the alignment device 20 in place.

Figure 16D:
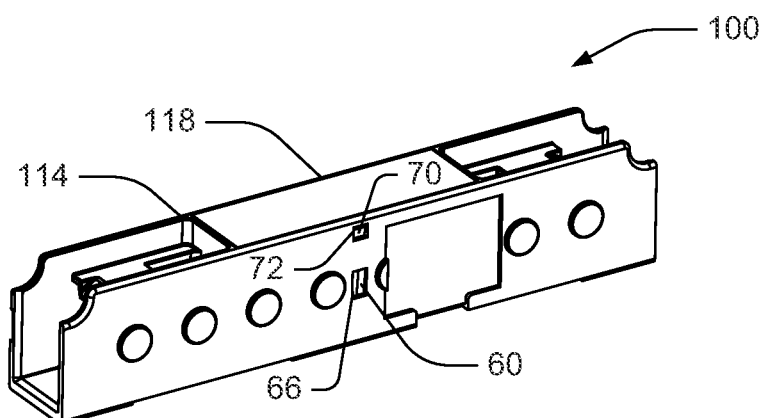
Figure 17:
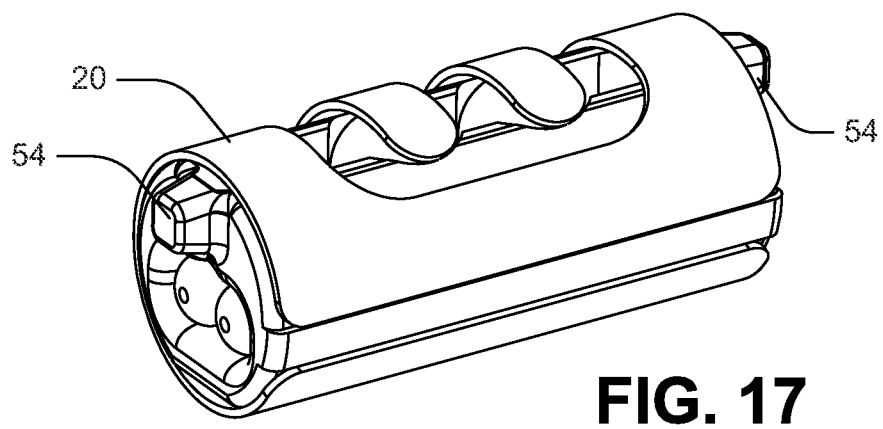
FIG. 17 is a perspective view of the adapter 20 illustrated in FIGS. 16A-16C.

The cover 118 is then placed over the opening 117 as shown in FIG. 16D. The cover 118 has one or more tabs 70 extending therefrom that are received by openings 72 to lock the cover in place. The cover 177 could also be glued or welded in place in addition to, or in place of, the tabs and recesses 70,72 to fasten the cover 118.

Referring back to FIG. 6, the connectors 202,204 each include caps 206 that are pivotally connected to the respective connectors 202,204. The caps 206 prevent dust and other debris from infiltrating the connectors 202,204. When the connectors 202,204 are inserted into the respective ends 102,104 of the adapter 100, the caps 206 pivot so as to uncover the ends of the connectors 202,204 as illustrated in FIG. 6. The mounting halves 50,52 have a curved upper edge 80 (best seen in the close up view of the mounting half 52 of FIG. 19) that helps guide the caps 206 to the open position illustrated in FIG. 6.

The above specification, examples and data provide a complete description of the manufacture and use of the composition of the invention. Since many embodiments of the invention can be made without departing from the spirit and scope of the invention, the invention resides in the claims hereinafter appended.

LIST OF REFERENCE NUMERALS AND CORRESPONDING FEATURES

10 cavity
20 optical fiber alignment device
24 alignment housing
26 alignment housing first end
28 alignment housing second end
22 fiber insertion axis
30 fiber alignment region
32 alignment groove
34 pocket
36 first funnel
38 second funnel
40 first ball
41 second ball
42 clip
44 first spring
45 second spring
50 first mounting half
52 second mounting half
54 tab
55 recess
56 projection
56a key
58 recess
60 ramped tabs
62 tabs
64 recess
66 openings
70 tabs
72 openings
80 curved upper edge
100 fiber optic adapter
100A first fiber optic adapter
100B second fiber optic adapter
102 adapter first end
104 adapter second end
106 first alignment structure
108 second alignment structure
110 first side wall
112 second side wall
114 top wall
116 bottom wall
117 opening
118 adapter cover
120 bosses
122 recesses
124 retaining clips
202 connector
204 connector
206 cap
212 first optical fiber
214 second optical fiber

What is claimed is:

1. A fiber optic adapter, comprising:
    a first side wall;
    a second side wall opposite the first side wall;
    a top wall;
    a bottom wall opposite the top wall;
    a cavity defined by the top wall, the bottom wall, the first side wall, and the second side wall;
    first and second mounting halves situated in the cavity, each of the first and second mounting halves having a planar front panel and a body defining a cylindrical opening extending from the planar front panel into the body to an end surface defined in the body opposite the planar front panel, the end surface extending perpendicular to an axis of the cylindrical opening, wherein the planar front of the first mounting half includes a projection extending therefrom opposite the cylindrical opening, and the planar front panel of the second mounting half includes a recess that receives the projection;
    a generally cylindrical optical fiber alignment device having first and second ends oriented perpendicularly to an axis of the alignment device and a central portion extending between the first and second ends, the central portion defining a circumference, the alignment device being received by the cylindrical openings in the first and second mounting halves;

an anti-rotation structure configured to prevent the alignment device from rotating when received in the first and second mounting halves, the anti-rotation structure including first and second anti-rotation tabs each extending axially from the respective first and second ends of the optical fiber alignment device parallel to the axis of the alignment device within the circumference of the central portion, wherein the first and second anti-rotation tabs are received in corresponding anti-rotation recesses formed in and extending into the respective end surfaces of the cylindrical openings of the first and second mounting halves;

an opening in the top wall; and a cover configured to selectively close the opening.

2. The fiber optic adapter of claim 1, wherein the first and second tabs do not extend radially beyond the central portion of the alignment device.

3. The fiber optic adapter of claim 1, wherein the optical fiber alignment device comprises:

an alignment housing including first and second ends, the alignment housing defining a fiber insertion axis that extends through the alignment housing between the first and second ends, the alignment housing including a fiber alignment region at an intermediate location between the first and second ends, the fiber alignment region including an alignment groove that extends along the fiber insertion axis and a pocket, the first end of the alignment housing including a first funnel that extends along the fiber insertion axis for guiding a first optical fiber into the fiber alignment region, the second end of the alignment housing including a second funnel that extends along the fiber insertion axis for guiding a second optical fiber into the fiber alignment region;

first and second fiber contact members positioned within the pocket of the alignment housing; and a biasing arrangement for urging the first and second fiber contact members generally toward the alignment groove.

4. The fiber optic adapter of claim 1, wherein the projection includes a plurality of keys extending therefrom.

5. The fiber optic adapter of claim 1, wherein the first and second mounting halves each include a bottom tab extending from a bottom surface of the respective planar front panels thereof, and wherein the bottom wall defines a recess that receives the bottom tabs extending from the mounting halves.

6. The fiber optic adapter of claim 1, wherein the first and second mounting halves each include a ramped tab extending from a side surface thereof, and wherein the first and second side walls each define an opening that receives the corresponding ramped tab.

7. The fiber optic adapter of claim 1, further comprising:
a first alignment structure on the first side wall; and
a second alignment structure on the second side wall corresponding to the first alignment structure and configured to cooperate with the first alignment structure on an adjacent fiber optic adapter.

8. The fiber optic adapter of claim 7, wherein:
the first alignment structure includes a plurality of bosses extending from the first side wall; and
the second alignment structure includes a plurality of recesses in the second side wall corresponding to the bosses.

* * * * *